United States Patent [19]

Seymour

[11] Patent Number: 5,447,400
[45] Date of Patent: Sep. 5, 1995

[54] WALL PENETRATOR FITTING

[75] Inventor: Herbert E. Seymour, Brentwood, Calif.

[73] Assignee: Xantech Corporation, Sylmar, Calif.

[21] Appl. No.: 210,898

[22] Filed: Mar. 17, 1994

[51] Int. Cl.⁶ .................. F16B 25/00; F16B 25/10
[52] U.S. Cl. .................. 411/387; 52/220.8; 52/741.1; 411/29
[58] Field of Search ........... 52/220.1, 220.8, 127.1; 411/29, 30, 31, 387, 508, 509, 913

[56] References Cited

U.S. PATENT DOCUMENTS

| | | | |
|---|---|---|---|
| 52,614 | 2/1866 | Smith | 411/311 |
| 2,713,284 | 7/1955 | Bedford, Jr. | 411/508 |
| 3,057,285 | 10/1962 | Wheeler | 411/387 X |
| 3,303,717 | 2/1967 | Valenti | 411/509 X |
| 4,293,258 | 10/1981 | McKewan | 411/30 |
| 4,302,917 | 12/1981 | Fermvik et al. | 52/220.8 |
| 4,617,692 | 10/1986 | Bond et al. | 411/29 X |
| 4,619,089 | 10/1986 | Harbeke | 52/220.8 |
| 4,986,709 | 1/1991 | Hachtel et al. | 411/387 X |
| 5,169,115 | 12/1992 | Chung hsiang | 411/509 X |

FOREIGN PATENT DOCUMENTS 0074365  9/1976  Australia .
0585887  2/1947  United Kingdom .

*Primary Examiner*—Carl D. Friedman
*Assistant Examiner*—Yvonne Horton-Richardson
*Attorney, Agent, or Firm*—Stinson, Mag & Fizzell

[57] ABSTRACT

A wall fitting for penetrating interior walls of a residential/commercial building which provides a through passage for running lengths of wiring such as for stereo, television, computer and other communication systems. The wall fitting includes a rigid, elongate tubular shaft having a head end and a tip end with a through passage extending the length of the shaft. The tip end is specifically adapted for penetrating sheetrock wall board. The shaft tip end is specially adapted for cutting through the wall board and has a plurality of transverse grooves located inwardly at the tip end for breakoff. A bezel fits over the stub end of the shaft to provide a finished appearance. A first alternative embodiment uses a handle specifically adapted to drive the wall fitting tubular shaft through the wall and with an easily removable and changeable penetrating tip end. A second alternative and preferred embodiment is similar, but has a metal inner shaft removable from the tubular shaft. The inner shaft provides rigidity for driving the tool through a wall.

6 Claims, 2 Drawing Sheets

WALL PENETRATOR FITTING

FIELD OF INVENTION

This invention relates to fasteners in general, and particularly to those fasteners which are adapted to penetrate walls.

BACKGROUND OF THE INVENTION

In entertainment and communication systems which are installed post-construction, wiring is generally run through walls for communication between, for example, a stereo tuner/amplifier and speakers. In other situations, hard wired television remote control devices can be positioned in other rooms and connected via communication lines to a remotely positioned satellite television tuner. When installation of such equipment is contemplated during building construction, it is easy to run lines down wall chases, but after construction is completed, it is extraordinarily difficult, if not impossible, to run wires down walls. In those situations, the preferred manner is to penetrate the walls at some unobtrusive location, such as in a corner, and run the wires between adjoining rooms. This has normally been done by drilling holes through the walls using a long shank drill bit. The exterior openings of the bore, which expose the interior sheetrock wall board, can be concealed by plastering or by inserting rubber or plastic grommets to provide a more finished appearance.

The instant invention provides a device which can be utilized by an aftermarket installer to easily penetrate the walls. The device is a wall fitting having an exterior passage and a sharpened driving tip which can be driven through the wall and the tip easily removed or broken off to leave a tubular channel mounted within the wall. Bezels that fit over the ends of the tube shaft provide a finished appearance.

OBJECTS OF THE INVENTION

The objects of the present invention are: to provide a wall fitting for passing wiring; to provide such a wall fitting which is specially adapted for wiring for home and business communication lines; to provide such a wall fitting which includes a hard tip for self-driving through a wall; to provide such a wall fitting in which the tip is frangible or separable for removal after driving through a wall; to provide such a wall fitting which has fingers that protrude outwardly and prevent withdrawal from the wall once in place; to provide a wall fitting which has bezels to provide a smooth finished appearance for the installed fitting; and to provide such a wall fitting which is relatively inexpensive to construct, easy to use and particularly well adapted for the intended purpose.

Other objects and advantages of the invention will become apparent from the following description.

DESCRIPTION OF THE PREFERRED EMBODIMENTS

Figure 1:
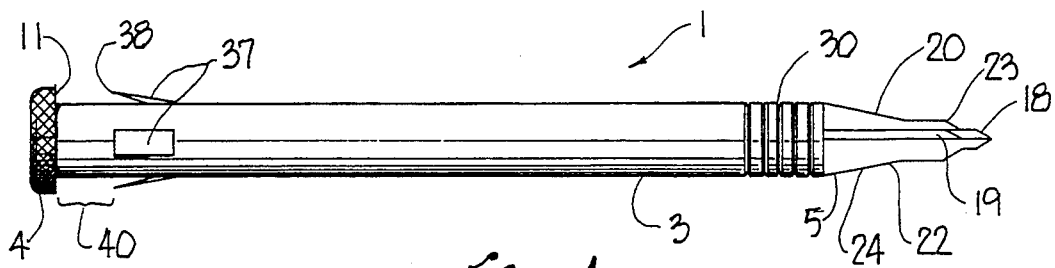
FIG. 1 is a longitudinal elevational view showing a wall fitting embodying the present invention.

As required, detailed embodiments of the present invention are disclosed herein. It is, however, to be understood that the disclosed embodiments are merely illustrative of the invention, which may be embodied in various forms. Therefore, specific structural and functional details disclosed herein are not to be interpreted as limiting, but merely as providing proper basis for the claims and as a representative basis for teaching one skilled in the art to employ the wall fitting in virtually any appropriately specific and detailed structure.

The reference numeral 1 generally refers to a wall fitting embodying the present invention. The wall fitting 1 is preferably formed of a tough, impact resistant synthetic resinous material, such as of DuPont Delrin. Alternatively, PVC or ABS material or even cast metal may be used. What is necessary is that the material be sufficiently strong so that the wall fitting 1 can be driven through a wall as disclosed herein and have sufficient strength to withstand hammer blows or the torque of a rotary drill.

The wall fitting 1 is generally formed of an elongate tubular shaft 3 having a head end 4 and a tip end 5. The shaft 3 is hollow with a cylindrical wall 7 providing an internal through bore or passage 8. The passage 8 extends from the head end 4 and is open to the exterior at the head end and extends in the opposite direction to the tip end 5. When the wall fitting is intact, the tip end 5, being solid, provides a block to the passage 8.

The head end 4 includes an external ring or flange 10 with a knurled outer surface. The juncture of the flange 10 and the shaft 3 is normally at a 90° angle to provide an orthogonal shoulder 11 for fitting snugly against the exterior surface of wall board.

Figure 3:
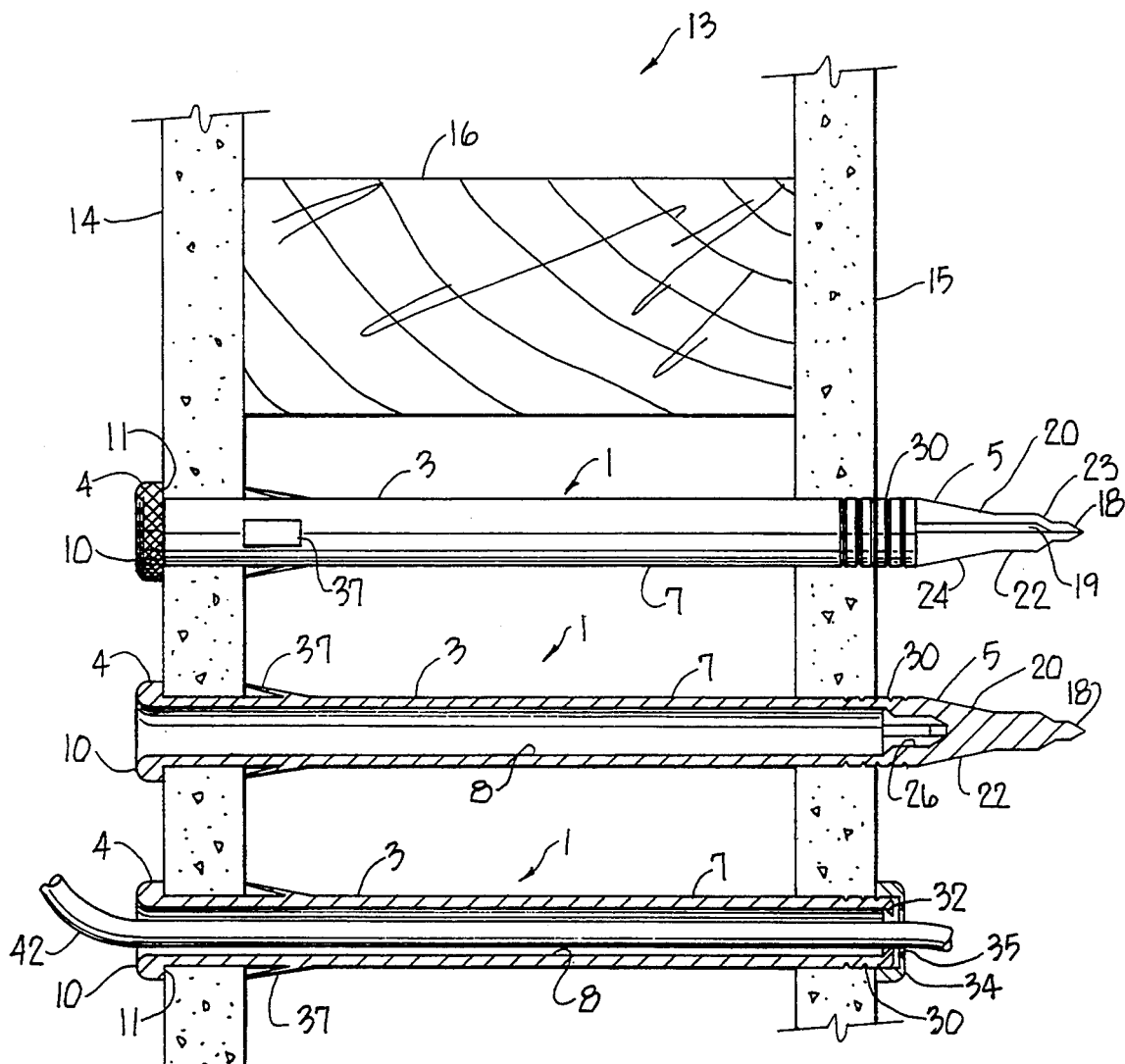
FIG. 3 is a fragmentary view showing a section of wall having three wall fittings positioned therein. Each of the wall fittings shown is depicted differently for purposes of illustration.

At this point, it is appropriate to discuss the configuration of the wall through which the wall fitting 1 is intended to be driven. The typical wall, FIG. 3, is an interior wall section 13 having opposite wall panels 14 and 15 of the type commonly called sheetrock or gypsum board. This material is readily penetrable by nails and can be easily drilled. The sheetrock wall panels 14 and 15 are normally one-half inch in thickness for residential vertical walls and five-eighths inch thick for commercial interior vertical walls. The sheetrock wall panels 14 and 15 are normally separated and nailed to interior wall structural members including the crossbrace 2×4 board 16.

Figure 2:
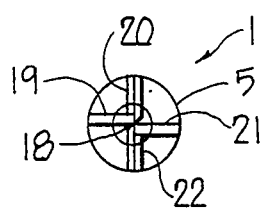
FIG. 2 is an end elevational view showing the tip of the wall fitting.

The wall fitting 1 is driven through the spaced sheetrock wall panels 14 and 15, and the pointed tip end 5 facilitates penetration. In the illustrated example, the tip end 5 includes a first penetrating point 18 and four penetrating blades, flukes or vanes 19, 20, 21 and 22, FIG. 2. Steps 23 and 24 extending rearwardly from the first penetrating point 18 facilitate penetration and are forwardly tapered. The vanes 19-22 also facilitate penetration and are particularly adapted for drilling rotation. Open areas between the structure defined by vanes 19-22 act as recesses in a drill bit during penetration. To enable drilling, the interior of the tip end 5 includes a drive bit receptacle 26, FIG. 3, which in the illustrated example is in the form of a Phillips bit. This enables a long shaft Phillips drive bit to be extended into the receptacle and the drill operated to rotate the bit and the wall fitting 1 to drive it through the wall section 13.

At the juncture of the tip end 5 with the shaft 3 are located a plurality of transverse grooves 30 which provide lines of weakness to promote or guide frangible separation of the tip end 5 from the shaft at a selected one of the grooves 30. Frangible separation can be accomplished by using large shears or cutters, such as bolt cutters, or depending upon the material of construction of the wall fitting 1, may be accomplished by a sharp hammer blow. The laterally unsupported tip end 5 tends to break off or separate from the shaft 3 at the juncture of the tip end 5 with the exterior surface of the wall panel 15, as shown in FIG. 3, so that the broken off stub or shaft end 32, FIG. 3, is generally coincident with the wall surface. A bezel 34 of annular cap, fits about and generally snaps or glues over the broken off shaft end 32 to provide a smooth, finished appearance. The bezel 34 includes a center hole 35 corresponding with the shaft passage 8 so that wiring can be run through the fitting 1.

As shown in FIG. 3, the wall fitting 1 is secured within the wall section 13 by the head end flange 10 and the broken off or stub end bezel 34. To also secure the fitting in the wall, tapered fingers 37 are positioned about the shaft 3 adjacent the head end 4 and extend outwardly toward the head end 4. The fingers 37 taper smoothly into the shaft 3 so that as the shaft is pushed into a hole cut into the wall section 13, the fingers spring outwardly and prevent exit of the wall fitting 1 once in place, FIG. 3. The distance between the expanded tips 38 of the fingers 37 and the head shoulder 11 is a distance 40 that is equal to the thickness of the sheetrock wall panel 14, such as one-half inch.

In use, the wall fitting may be hammered through an interior wall section 13 or may be drilled therethrough, as by extending a long shank Phillips drive bit into the drive bit receptacle 26 and using the fluted tip end 5 as a drill bit. The wall fitting 1 forms its own hole as it penetrates through the wall section 13 and upon being pressed fully inwardly until the shoulder 11 is flush against the exterior of the wall panel 14, the tapered fingers 37 holds the fitting 1 in place. Next, the tip end 5 is separated from the shaft 3 and a bezel 34 added by a snap-on fit or gluing to present a finished appearance. Finally, wiring 42 as desired is run through the fitting 1 for installation of communications cables or wiring for home entertainment systems components.

Figure 4:
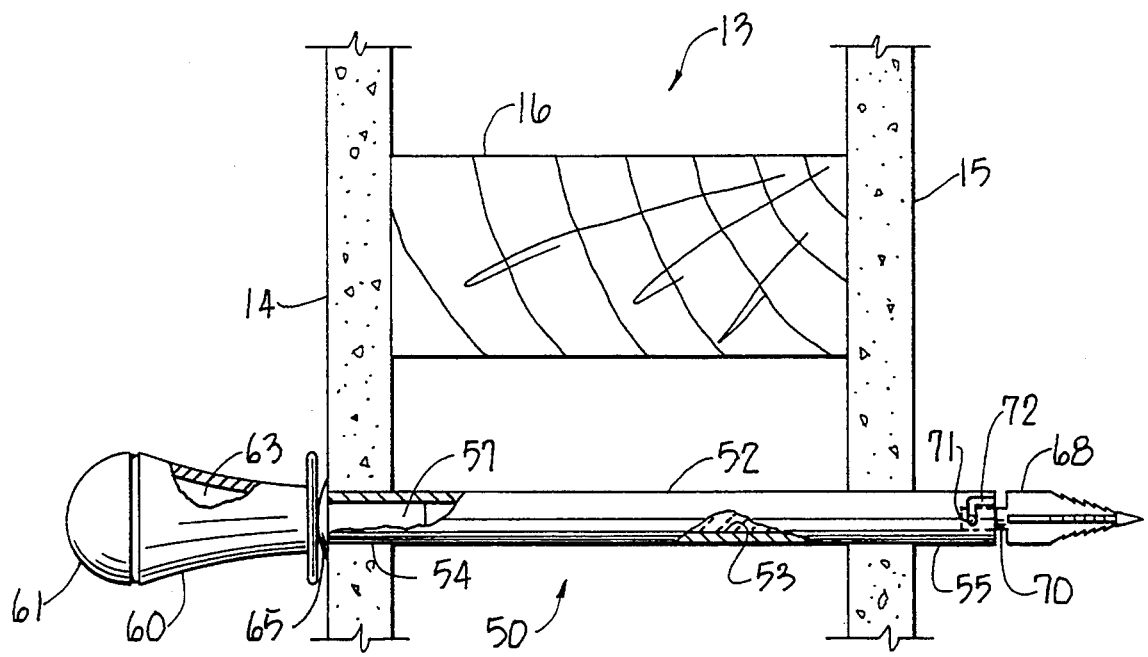
FIG. 4 is a fragmentary view showing a section of a wall having an alternative embodiment of wall fitting extended therethrough.

An alternative embodiment wall fitting. 50 is shown in connection with FIG. 4. The wall fitting 50 is formed of ABS plastic and includes a hollow, cylindrical tubular shaft 52 with a through passage 53 and handle and tip ends 54 and 55. The through passage 53 may be cylindrical but is preferably non-round at the handle end 54 for fitting to the noncylindrical stub end 57 of a handle 60. The stub end 57 may be polygonal or other configuration so as not to rotate within the handle end 54. The handle may also include a removable cap 61 for access to a hollow receptacle 63 for storage of items. The handle 60 may be T-shaped or other shape to aid in grasping and rotation. A bezel 65 covers the end of the handle end 54.

With respect to FIG. 4, there is a removable penetrating tip 68 generally in the form of the tip 5. However, the tip 68 is not frangibly separated from the shaft 52 but is removably and replaceably connected thereto by a pin and groove locking joint formed by a stub 70 fitted within the passage 53 and having a radially extending pin 71 received within an angled slot 72. The angled slot 72 is preferably a right angle slot, and when the handle is rotated to cut through the wall 13, it is rotated counterclockwise.

With the wall fitting 50, after the shaft 52 has been extended through the wall 13, the handle 60 is pulled straight rearwardly to remove the stub end 57 from the handle end 54. Next, the tip 68 is rotated clockwise and pulled out to remove it from the tip end 55, leaving an open passage to run wires through. To present a finished appearance, a bezel 34, FIG. 3, may be placed over the tip end 55 and secured, as by gluing.

Figure 5:
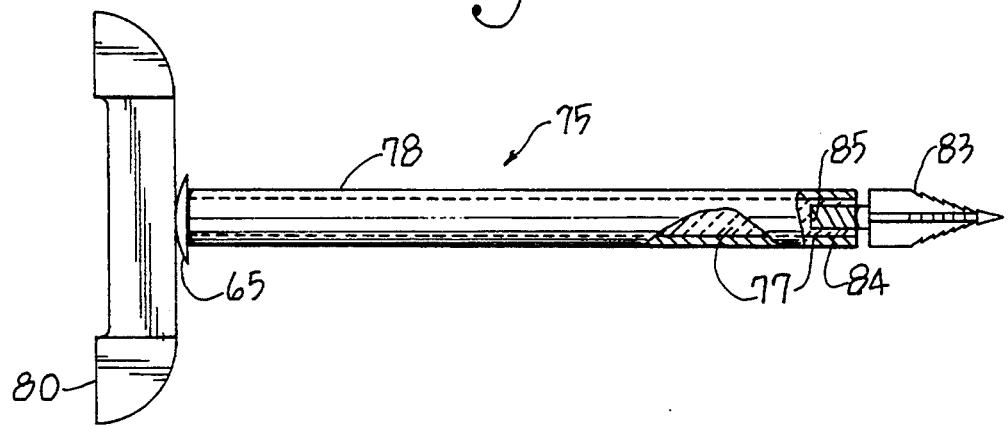
FIG. 5 is a fragmentary view of a second alternative embodiment of wall fitting.

A second alternative embodiment wall fitting 75 is shown in connection with FIG. 5 and which is substantially similar to the wall fitting 50. A distinction is the presence of a solid inner shaft 77 extending through a tubular shaft 78. One end of the inner shaft 77 is connected to a handle 80, such as a wing shaped handle, and the other end of the inner shaft 77 is removably connected to a bladed tip 83 which is substantially the same as the tips 5 and 68. The tip 83 has a square shank 84 extending into a square recess 85 so that as the handle 80 is rotated, the bladed tip 83 also rotates and drills through a wall 13. As the outer diameter of the tip 83 is the same as the outer diameter of the tubular shaft 78, the shaft 78 follows neatly through the hole drilled by the bladed tip 83. Once the tubular shaft 78 is fully run through the wall 13, the tip 83 is disengaged from the inner shaft 77 and the handle 80 pulled rearwardly to slide the inner shaft 77 outwardly from the tubular shaft 78. This leaves a passage through which wires can be run. Further, a bezel 34, such as described in connection with FIG. 3, can be applied to present a finished appearance.

It is to be understood that while certain forms of this invention have been illustrated and described, the invention is not limited thereto except insofar as such limitations are included in the following claims.

What is claimed and desired to be secured as Letters Patent is as follows:

1. A wall fitting for running wires through a wall and comprising:
   a) a rigid elongate outer tubular shaft having a head end and a tip end with a passage extending the length of said shaft;
   b) a handle positioned adjacent said head end and configured for grasping and rotation;
   c) an inner shaft extending through said passage and rotatable with said handle;
   d) a cutter tip mounted on a remote end of said inner shaft and being of a diameter corresponding to said outer shaft so that when said handle is rotated to cause said inner shaft to cut through a wall, said outer shaft fits into a hole cut therethrough; and
   e) said cutter tip being separable relative to said handle so that said inner shaft can be withdrawn from said passage in order to run wires therethrough.

2. The wall fitting set forth in claim 1 wherein said cutter tip is removably joined to said inner shaft at said tip end.

3. The wall fitting set forth in claim 2 wherein said cutter tip is removably joined to said inner shaft at said tip end by a pin and groove locking joint.

4. A wall fitting for running wires through a wall and comprising:
   a) a rigid, elongate shaft having a head end and a tip end with a through passage extending the length of said shaft;

b) said head end having a flange for fitting against an outside surface of a first wall board;
c) a removable and replaceable handle engageable with said head end for grasping and drilling said shaft through said first wall board and a second wall board;
d) a removable and replaceable penetrator tip and means connecting said tip to said shaft at said tip end, said penetrator tip having cutter blades for cutting through said first and second wall boards and being removable when said shaft is extended through and emplaced within said first and second wall boards; and
e) said means connecting said tip to said shaft including a stub from said tip insertable into said shaft passage and a pin extending from said stub receivable into a slot in said shaft tip end.

5. A fitting for running wires through a wall and comprising:
   a) A rigid, elongate shaft having a head end and a tip end with a through passage extending the length of said shaft;
   b) said head end having a flange for fitting against an outside surface of a first wall board and legs for engaging an inside surface of said first wall board; and
   c) said tip end including a bladed tip for rotationally cutting through said first wall board and a second wall board, a drill drive bit receptacle within said tip end for augering said shaft through said first and second wall boards, and having a plurality of transverse grooves located inwardly of said tip end and forming lines of weakness for frangible separation of said bladed tip adjacent to an outside surface of said second wall board and leaving a stub end.

6. A method for installing a wall fitting and running wires through a wall, comprising:
   a) providing a rigid, elongate shaft having a head end and a tip end with a through passage extending the length of said shaft, said head end having a flange for fitting against an outside surface of a first wall board, and said tip end tapering and having vanes for augering penetration of a first and a second wall board forming a wall, and having means for separation from said shaft;
   b) rotatably driving said shaft through said first and second wall boards so that said tip end protrudes beyond said second wall board;
   c) separating said tip end from said shaft, leaving said shaft in said wall; and
   d) running a wire through said shaft through passage.

* * * * *